United States Patent
Yajima et al.

(10) Patent No.: US 8,792,442 B2
(45) Date of Patent: Jul. 29, 2014

(54) MOBILE COMMUNICATION METHOD AND RADIO BASE STATION

(75) Inventors: Tatsuro Yajima, Kawasaki (JP); Akihito Hanaki, Yokohama (JP); Hidehiko Oyane, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 71 days.

(21) Appl. No.: 13/318,458

(22) PCT Filed: Apr. 30, 2010

(86) PCT No.: PCT/JP2010/057716
§ 371 (c)(1),
(2), (4) Date: Nov. 1, 2011

(87) PCT Pub. No.: WO2010/126149
PCT Pub. Date: Nov. 4, 2010

(65) Prior Publication Data
US 2012/0051316 A1     Mar. 1, 2012

(30) Foreign Application Priority Data
May 1, 2009    (JP) .................................. 2009-112301

(51) Int. Cl.
*H04W 72/12*    (2009.01)

(52) U.S. Cl.
USPC ......................................................... 370/329

(58) Field of Classification Search
CPC ..... H04L 29/06; H04L 1/1812; H04L 1/1829; H04L 1/1867; H04L 69/324; H04W 72/1268; H04W 76/048; H04W 72/1294
USPC .................................................. 370/328–330
See application file for complete search history.

(56) References Cited

U.S. PATENT DOCUMENTS

| | | | |
|---|---|---|---|
| 2006/0165045 A1* | 7/2006 | Kim et al. | 370/349 |
| 2008/0032725 A1 | 2/2008 | Usuda et al. | |
| 2010/0014477 A1* | 1/2010 | Schliwa-Bertling et al. | 370/329 |
| 2010/0157953 A1* | 6/2010 | Christoffersson et al. | 370/336 |

FOREIGN PATENT DOCUMENTS

| | | |
|---|---|---|
| JP | 2004-129085 A | 2/2006 |
| JP | 2008-541596 A | 11/2008 |
| WO | WO 2005/125259 A1 | 12/2005 |
| WO | WO 2006/120540 A1 | 11/2006 |

* cited by examiner

*Primary Examiner* — Jae Y Lee
*Assistant Examiner* — Jean F Voltaire
(74) *Attorney, Agent, or Firm* — Marvin A. Motsenbocker; Mots Law, PLLC

(57) ABSTRACT

A mobile communication method includes step for transmitting a first scheduling grant information to a first mobile station UE scheduled in a current scheduling assignment slot, and transmitting a second scheduling grant information to a second mobile station UE to be scheduled in a next TTI by the radio base station Node B at a time of switching between mobile stations UE to be scheduled, the first scheduling grant information instructing to stop transmission of a MAC-e PDU in a next transmission time interval, the first scheduling grant information corresponding to a minimum size of the MAC-e PDU which can contain only one MAC-d PDU.

2 Claims, 3 Drawing Sheets

| E-TFCI | TBS (MAC-e PDU) | TRANSMISSION POWER RATIO (E-DPDCH/DPCCH) |
|---|---|---|
| 0 | 18 | $(5/15)^2$ |
| 1 | 120 | $(6/15)^2$ |
| 2 | 124 | $(7/15)^2$ |
| ⋮ | ⋮ | ⋮ |
| 7 | 354 | $(27/15)^2$ |
| 124 | 11460 | $(150/15)^2 \times 6$ |
| 125 | 11478 | $(168/15)^2 \times 6$ |

MOBILE COMMUNICATION METHOD AND RADIO BASE STATION

TECHNICAL FIELD

The present invention relates to a mobile communication method and a radio base station.

BACKGROUND ART

The 3GPP defines a high-speed uplink data communication which is referred to as "EUL (Enhanced Uplink)" or "HSUPA (High-Speed Uplink Packet Access)."

In EUL, a mobile station UE is configured to transmit a second protocol data unit (MAC-e PDU) containing one or more first protocol data units (MAC-d PDU) with a fixed data size to a radio base station NodeB via E-DPDCH (E-DCH Dedicated Physical Data Channel).

Specifically, in EUL, the radio base station NodeB is configured to determine a mobile station UE to be scheduled in each time slot (TTI: Transmission Time Interval) and transmit a scheduling grant information (AG: Absolute Grant, RG: Relative Grant) to the mobile station UE to be scheduled.

Also, the mobile station UE to be scheduled in each TTI is configured to transmit MAC-e PDU with TBS (Transport Block Size) according to an allowed value (SG: Scheduling Grant) determined by using the scheduling grant information (AG/RG) received via the E-DPDCH from the radio base station NodeB.

In addition, in EUL of the "Time and Rate" system, only one mobile station UE is treated as a mobile station UE to be scheduled in each scheduling assignment slot.

However, the aforementioned EUL of the "Time and Rate" system has a problem that it has not been determined yet what scheduling grant information (AG) the radio base station NodeB has to transmit at a time of switching between mobile stations UE to be scheduled.

Hence, the present invention has been made in view of the foregoing problem. Accordingly, an objective of the invention is to provide a mobile communication method and a radio base station which can notify proper scheduling grant information to a mobile station UE to be scheduled in the next scheduling assignment slot in EUL of "Time and Rate" system.

SUMMARY OF INVENTION

A mobile station according to the first feature is summarized in that the mobile station transmits a second protocol data unit containing one or more first protocol data units with a fixed size to a radio base station via a high-speed uplink data channel and a mobile communication method includes steps of determining, by the radio base station, only one mobile station to be scheduled in each scheduling assignment slot, transmitting a first scheduling grant information to a first mobile station scheduled in a current scheduling assignment slot, and transmitting a second scheduling grant information to a second mobile station to be scheduled in a next scheduling assignment slot by the radio base station at a time of switching between mobile stations to be scheduled, the first scheduling grant information instructing to stop transmission of the second protocol data unit in a next transmission time interval, the first scheduling grant information corresponding to a minimum size of the second protocol data unit which can contain only one first protocol data unit, and transmitting, by the second mobile station, the second protocol data unit with the size corresponding to the second scheduling grant information in the next scheduling assignment slot.

The second feature is summarized in that a radio base station configured to receive a second protocol data unit containing one or more first protocol data units with a fixed size transmitted by a mobile station via a high-speed uplink data channel and the radio base station includes a scheduling unit configured to determine only one mobile station to be scheduled in each scheduling assignment slot, and a scheduling grant information transmission unit configured to, at a time of switching between mobile stations to be scheduled, transmit a first scheduling grant information to a first mobile station scheduled in a current scheduling assignment slot, and transmit a second scheduling grant information to a second mobile station to be scheduled in a next scheduling assignment slot, the first scheduling grant information instructing to stop transmission of the second protocol data unit in a next transmission time interval, the first scheduling grant information corresponding to a minimum size of the second protocol data unit which can contain only one first protocol data unit.

BRIEF DESCRIPTION OP THE DRAWINGS

MODES FOR CARRYING OUT THE INVENTION

Configuration of a Mobile Communication System According to a First Embodiment of the Invention Referring to FIGS. 1 through 5, a configuration of a mobile communication system according to a first embodiment of the invention is described.

Figure 1:
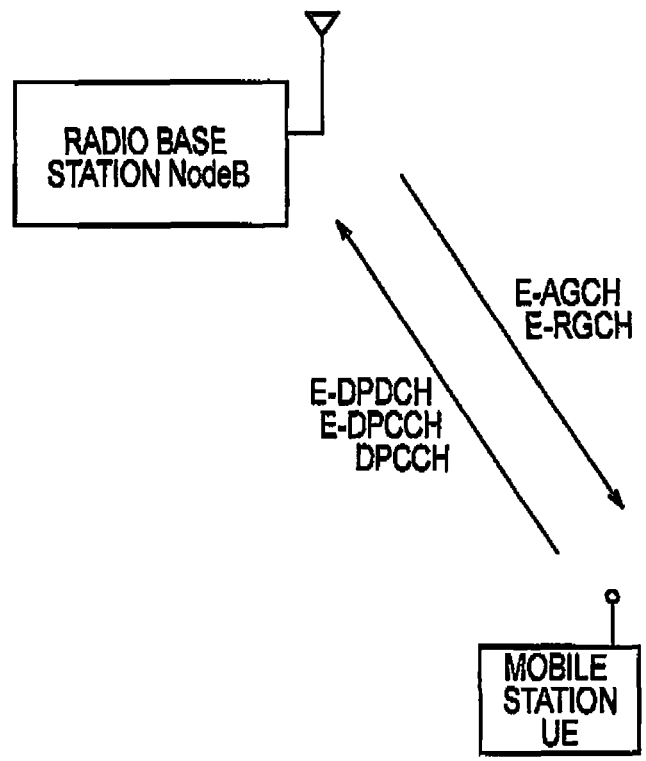
FIG. 1 is an entire configuration diagram of a mobile communication system according to a first embodiment of the invention.

As shown in FIG. 1, the mobile communication system according to the embodiment is configured to be capable of providing EUL between a radio base station NodeB and a mobile station UE.

To be more specific, the mobile communication system according to the embodiment enables the radio base station NodeB and the mobile station UE to establish downlink channels such as E-AGCH (E-DCH Absolute Grant Channel) and E-RGCH (E-DCH Relative Grant Channel) and uplink channels such as E-DPDCH (E-DCH Dedicated Physical Data Channel), E-DPCCH (E-DCH Dedicated Physical Control Channel), and DPCCH (Dedicated Physical Control Channel).

Here, the radio base station NodeB is configured to receive MAC-e PDU containing one or more MAC-d PDUs with a fixed size and transmitted by the mobile station UE via E-DPDCH.

Figure 2:
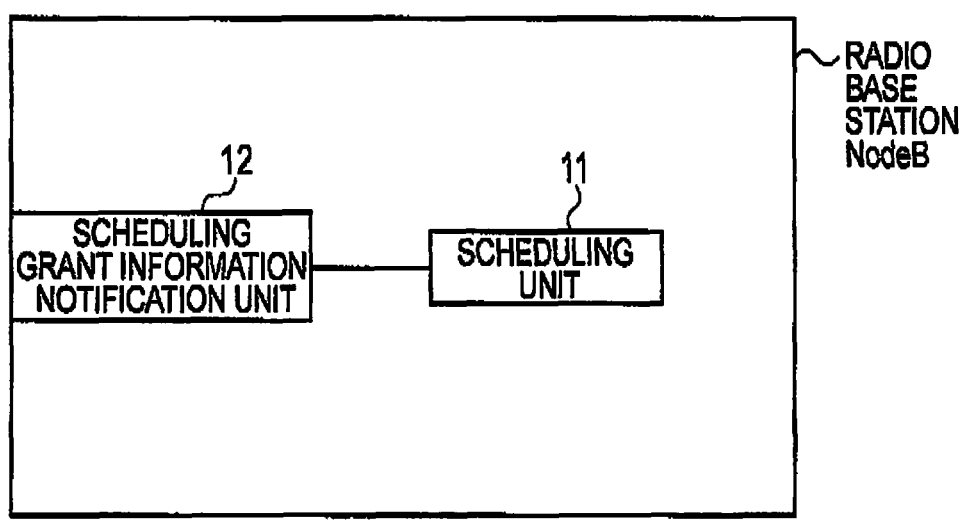
FIG. 2 is a functional block diagram of a radio base station according to the first embodiment of the invention.

As shown in FIG. 2, the radio base station NodeB includes a scheduling unit 11 and a scheduling grant information notification unit 12.

The scheduling unit 11 is configured to determine a mobile station UE to be scheduled in each scheduling assignment slot and scheduling grant information to be transmitted to the mobile station UE.

Here, each scheduling assignment slot is a slot including one or more TTIs (HARQ process). Note that, in EUL, TTI is defined as 2 ms or 10 ms.

Specifically, the scheduling unit 11 is configured to determine only one mobile station UE to be scheduled in each scheduling assignment slot in accordance with the EUL of "Time and Rate" system.

The scheduling grant information notification unit 12 is configured to transmit an AG (Absolute Grant) or an RG (Relative Grant) as a scheduling grant information via. E-AGCH or E-RGCH to a mobile station UE to be scheduled in each scheduling assignment slot (that is, a serving mobile station using a cell under the control of the radio base station NodeB as a serving cell).

Figures 3, 4:
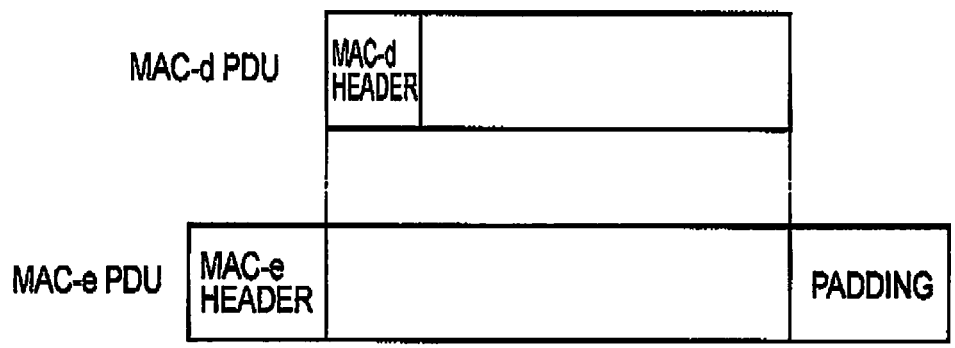
FIG. 3 is a correspondence table showing one example in which TBS and a transmission power ratio are used in association with one another in the mobile communication system according to the first embodiment of the invention.
FIG. 4 is a drawing for illustrating a scheduling grant information to be transmitted by the radio base station according to the first embodiment of the invention to a mobile station to be scheduled in the next scheduling assignment slot.

Note that the radio base station NodeB and the mobile station UE manage a correspondence table as shown in FIG. 3. As shown in FIG. 3, the correspondence table is configured to associate "E-TFCI (E-DCH Transport Format Combination Indicator)," "TBS," and "transmission power ratio" with one another.

Here, the "E-TFCI" is an index, "TBS" shows a size of MAC-e PDU corresponding to "E-TFCI," and "transmission power ratio" shows a transmission power ratio between E-DPCCH and DPCCH corresponding to "E-TFCI." Note that transmission power of DPCCH may be changed by transmission power control performed by the radio base station NodeB and the mobile station UE.

The AG is a value indicating the SG, while the RG is a value instructing an increase or decrease of the "transmission power ratio" (Up/Down/Hold).

The mobile station UE to be scheduled in each scheduling assignment slot is configured to transmit MAC-e PDU with TBS corresponding to the SG stored in the mobile station UE, itself, via E-DPDCH at transmission power determined by the transmission power ratio corresponding to the SG.

Note that each mobile station UE is configured to update the SG stored therein according to scheduling grant information received by the mobile station UE.

Also, the scheduling grant information notification unit 12 may be configured to transmit RG (Down/Hold) via E-RGCH to a mobile station UE (non-servicing mobile station) which uses a cell under the control of the radio base station NodeB as a non-serving cell.

Note that the scheduling grant information notification unit 12 is configured to transmit a "Zero Grant (a first scheduling grant information)" instructing to stop transmission of MAC-e PDU in the next TTI to a mobile station UE (a first mobile station) scheduled in the current scheduling assignment slot, and transmit an "AG (a second scheduling grant information)" corresponding to the minimum size of MAC-e PDU which can contain only one MAC-d PDU to a mobile station UE (a second mobile station) to be scheduled in the next scheduling assignment slot, at the time of switching between the mobile stations UE to be scheduled.

Here, FIG. 4 shows an example of a format of minimum MAC-e PDU which can contain only one MAD-d PDU.

In the example of FIG. 3, if the size of MAC-d PDU is "336 bits," the minimum size of MAC-e PDU which can contain only one MAC-d PDU is "354 bits."

In such a case, the scheduling grant information notification unit 12 is configured to transmit an "AG (=7)" corresponding to "354 bits" to the mobile station UE to be scheduled in the next scheduling assignment slot, at the time of switching between the mobile stations UE to be scheduled.

Figure 5:
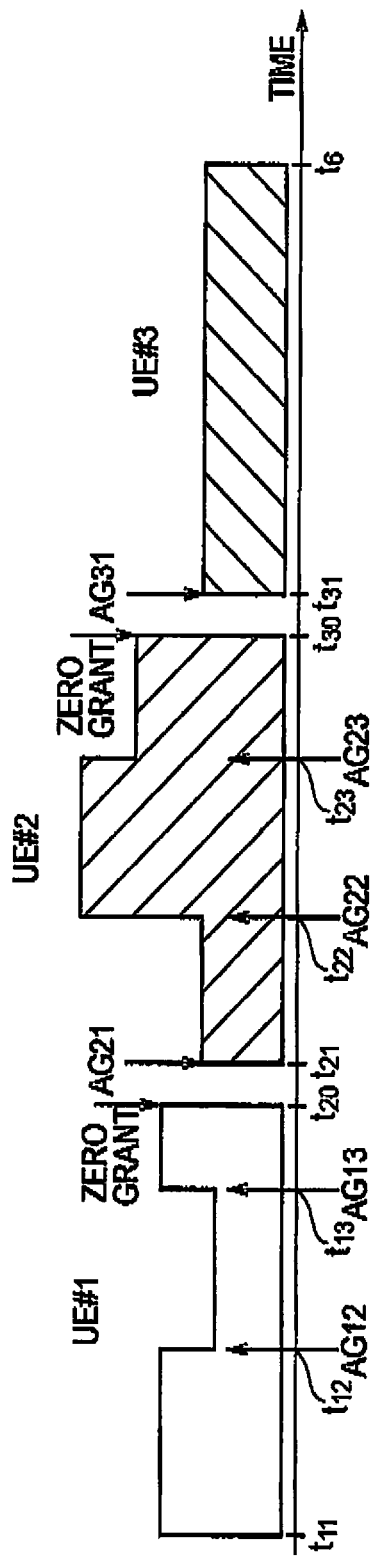
FIG. 5 is a drawing for illustrating EUL in the "Time and Rate" system which is used in the mobile communication system according to the first embodiment of the invention.

In the example of FIG. 5, the radio base station NodeB transmits AG12, AG13 to a mobile station to be scheduled UE#1 at time t12, t13. Then, after determining to switch the mobile station UE to be scheduled from the mobile station UE#1 to a mobile station UE#2, the radio base station NodeB transmits a "Zero Grant" to the mobile station UE#1 at time t20, and transmits AG21 to the scheduled mobile station UE#2 at time t21.

Here, the AG21 is an AG corresponding to the minimum size of MAC-e PDU which can contain only one MAC-d PDU.

Thereafter, the radio base station NodeB transmits AG22, AG23 to the scheduled mobile station UE#2 at time t22, t23. After determining to switch the mobile station UE to be scheduled from the mobile station UE#2 to a mobile station UE#3, the radio base station NodeB transmits a "Zero Grant" to the mobile station UE#2 at time t30, and then transmits AG31 to the scheduled mobile station UE#3 at time t31.

Here, AG31 is an AG corresponding to the minimum size of MAC-e PDU which can contain only one MAD-d PDU.

Note that an RG may be transmitted in place of AG12, AG13, AG22, and AG23.

Advantageous Effects of the Mobile Communication Station According to the First Embodiment The mobile communication system according to the first embodiment of the invention is capable of establishing the EUL of "Time and Rate" system in such a way that the radio base station NodeB transmits the "Zero Grant" to the mobile station UE scheduled in the current scheduling assignment slot and transmits the "AG" to the mobile station UE to be scheduled in the next scheduling assignment slot, at the time of switching between the mobile stations UE to be scheduled.

Also, the mobile communication system according to the first embodiment of the invention is capable of avoiding a situation where excessive radio resources are assigned to a mobile station UE to be scheduled in the next scheduling assignment slot in such a way that the radio base station NodeB transmits the AG corresponding to the minimum size of MAC-e PDU which can contain only one MAC-d PDU to the mobile station UE to be scheduled in the next scheduling assignment slot at the time of switching between the mobile stations UE to be scheduled.

Note that the above described operations of the radio base station NodeB and the mobile station UE may be implemented by hardware, may be implemented by a software module executed by a processor, or may be implemented by a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the radio base station NodeB and the mobile station UE.

Also, the storage medium and the processor may be provided in the radio base station NodeB and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

INDUSTRIAL APPLICABILITY

As described above, the invention can provide a mobile communication method and a radio base station that can notify proper scheduling grant information to a mobile station UE to be scheduled in each scheduling assignment slot in EUL of "Time and Rate" system.

The invention claimed is:

1. A mobile communication method in which a mobile station transmits Media Access Control-layer e Protocol Data Unit (MAC-e PDU) containing one or more Media Access Control-layer d Protocol Data Units (MAC-d PDUs) with a fixed size to a radio base station via a high-speed uplink data channel, the method comprising the steps of:

determining, by the radio base station, only one mobile station to be scheduled in each scheduling assignment slot;

transmitting a first scheduling grant information to a first mobile station scheduled in a current scheduling assignment slot, and transmitting a second scheduling grant information to a second mobile station to be scheduled in a next scheduling assignment slot by the radio base station at a time of switching between mobile stations to be scheduled, the first scheduling grant information instructing to stop transmission of the MAC-e PDU in a next transmission time interval, the first scheduling grant information corresponding to a minimum size of the MAC-e PDU which can contain only one MAC-d PDU; and transmitting, by the second mobile station, the MAC-e PDU with the size corresponding to the second scheduling grant information in the next scheduling assignment slot, wherein the MAC-d PDU is 336 bits and the minimum size of the MAC-e PDU is 354 bits.

2. A radio base station configured to receive a Media Access Control-layer e Protocol Data Unit (MAC-e PDU) containing one or more Media Access Control-layer d Protocol Data Units (MAC-d PDUs) with a fixed size transmitted by a mobile station via a high-speed uplink data channel, the radio base station comprising:

a scheduling circuit configured to determine only one mobile station to be scheduled in each scheduling assignment slot; and a scheduling grant information transmission circuit configured to, at a time of switching between mobile stations to be scheduled, transmit a first scheduling grant information to a first mobile station scheduled in a current scheduling assignment slot, and transmit a second scheduling grant information to a second mobile station to be scheduled in a next scheduling assignment slot, the first scheduling grant information instructing to stop transmission of the MAC-e PDU in a next transmission time interval, the first scheduling grant information corresponding to a minimum size of the MAC-e PDU which can contain only one MAC-d PDU, wherein the MAC-d PDU is 336 bits and the minimum size of the MAC-e PDU is 354 bits.

* * * * *